Patented Dec. 4, 1951

2,577,207

UNITED STATES PATENT OFFICE 2,577,207

PRODUCTION OF PHOSPHORUS OXYSULFIDES

John Carl Pernert, Niagara Falls, N. Y., assignor to Oldbury Electro-Chemical Company, Niagara Falls, N. Y., a corporation of New York No Drawing. Application February 10, 1949, Serial No. 75,749

6 Claims. (Cl. 23—203)

The present invention relates to oxysulfides of phosphorus, particularly phosphorus trioxydisulfide ($P_4S_4O_6$ or $P_2S_2O_3$), which is also known as phosphorus sulfoxide and tetraphosphorus tetrathio hexoxide, and relates specifically to a new and advantageous method for the production of the said compounds from materials that are readily available and obtainable in a substantially pure form. The invention relates also to a new oxysulfide of phosphorus having the empirical formula $P_6S_5O_{10}$.

The preparation of phosphorus trioxydisulfide was first reported by T. E. Thorpe and A. E. H. Tutton, J. Chem. Soc. (London), 1891, vol. 59, pages 1019–29, who obtained it by the reaction of phosphorus trioxide ($P_2O_3$) with sulfur in a sealed tube at 160 degrees centigrade and who called it phosphorus sulfoxide. They described their product as a yellowish-gray solid which sublimed at 140 to 150 degrees centigrade to yield colorless, feathery crystals. It was reported to melt at 102 degrees centigrade and to distill at 295 degrees centigrade at atmospheric pressure without decomposition, condensing as a pale yellow liquid. It is soluble in carbon disulfide, from which it may be crystallized, and other organic solvents. Phosphorus trioxydisulfide dissolves in benzene but it reacts therewith. Thorpe and Tutton studied its vapor density, and its electron diffraction characteristics in the gas phase have been studied by A. J. Stosick, J. Am. Chem. Soc., 1939, vol. 61, pages 1130-2.

Another known oxysulfide of phosphorus, which was first prepared by A. Besson (Compt. rend., 1897, vol. 124, page 151) by dissolving hydrogen sulfide in phosphorus oxychloride, is reported as phosphorus dioxytrisulfide, $P_2O_2S_3$, described as a yellowish-white substance that crystallizes from phosphorus oxychloride in small acicular crystals. The compound decomposes at 150 degrees centigrade, yielding a sublimate of phosphorus pentasulfide.

Phosphorus trioxide, the starting material that has heretofore been used for the preparation of phosphorus trioxydisulfide, is not readily available and is not as easy to prepare as phosphorus pentoxide. The reaction of phosphorus trioxide with sulfur may be violent and the known method is not readily adaptable to the production industrially of this compound. Although phosphorus trioxydisulfide, because of its high thermal stability, lends itself to production in a relatively pure state and is a desirable starting material for the synthesis and production of other phosphorus compounds, the difficulty in controlling the reactions involved in its preparation and the difficulty in obtaining phosphorus trioxide of adequate purity have militated against the more extensive industrial use of phosphorus trioxydisulfide.

It is a principal object of the present invention to provide a process for the production of phosphorus oxysulfides, particularly phosphorus trioxydisulfide, from a material other than phosphorus trioxide. It is a further object of the invention to provide a process that is more readily controllable than the process involving the reaction of phosphorus trioxide and sulfur. Another object of the present invention is to provide a simplified process in which substantially pure phosphorus trioxydisulfide can be readily produced at low cost. It is also an object of my invention to produce new and useful oxysulfides of phosphorus. Further objects and advantages of the invention, some of which are referred to hereinafter, will be apparent to those skilled in the art to which the invention pertains.

I have discovered that phosphorus trioxydisulfide and other oxysulfides of phosphorus can be prepared by the reaction of phosphorus pentoxide and phosphorus pentasulfide. The reaction to produce phosphorus trioxydisulfide may be represented as:

$$6P_2O_5 + 4P_2S_5 \rightarrow 5P_4S_4O_6$$

Phosphorus pentoxide is more readily available in pure form and is more stable and is easier to prepare than phosphorus trioxide. Phosphorus pentasulfide is readily available and can be obtained in a high degree of purity. In the process of my invention, however, it is not necessary to use highly purified starting materials. The reaction itself is effected by heating a mixture of the two materials and it progresses smoothly without violence and is readily controlled.

In accordance with a preferred embodiment of the process of my invention for the production of phosphorus trioxydisulfide an intimate mixture of approximately two molecular proportions of phosphorus pentasulfide and approximately three molecular proportions of fresh phosphorus pentoxide is heated in a suitable distillation or dephlegmating apparatus at a temperature within the range of approximately 400 degrees to approximately 500 degrees centigrade (or higher at superatmospheric pressure). The phosphorus trioxydisulfide distills smoothly from the reaction mixture as it is formed therein, and condenses as a clear, pale canary yellow liquid, which has a melting point of approximately 100 degrees centigrade. The crude condensate may be further purified by redistillation, preferably at subatmospheric pressure, to obtain a product having a melting point of approximately 102 degrees centigrade. The boiling point of the pure product is approximately 295 degrees centigrade at atmospheric pressure and 180 to 190 degrees at a pressure of twenty millimeters of mercury. As thus obtained, the redistilled product is a pale canary yellow-colored solid, similar to paraffin wax in appearance, which when freshly prepared, is plastic enough at room temperature to be deformed by application of moderate pressures thereto. The yield of such product is generally more than fifty percent of the stoichiometrical amount, and other oxysulfides of phosphorus can be recovered from the reaction mixture as residue, if desired.

The reaction of phosphorus pentoxide and phosphorus pentasulfide in accordance with the process of my invention, can also be conducted at superatmospheric pressure, if desired, or at subatmospheric pressure, whereby the temperature at which the mixture of phosphorus pentoxide and phosphorus pentasulfide is heated may be correspondingly higher or lower than the minimum and maximum specified herein for operation at approximately atmospheric pressure.

Although approximately stoichiometric amounts of reactants are preferred for use in the process of my invention, as hereinafter specified, the relative proportions of the two reactants may be varied widely, in which event phosphorus trioxydisulfide may constitute only a small proportion of the product, and the preponderant product may be one or more other oxysulfides of phosphorus or mixtures thereof. By use of my process I have obtained a new oxysulfide of phosphorus which has the composition $P_6S_5O_{10}$. This compound and methods for its production are described in Example 6 hereinafter.

The following examples are illustrative of specific methods of practicing the process of my invention.

Example 1

Four hundred forty-four (444) grams (approximately two moles) of powdered phosphorus pentasulfide ($P_2S_5$) and 426 grams (approximately three moles) of powdered phosphorus pentoxide ($P_2O_5$) were intimately mixed. A small quantity of this mixture was introduced through a paper tube into a glass test tube, twenty-four inches long by one and one-quarter inches in diameter, which was slightly constricted at two points to form three interconnected compartments, so as to fill only the lower compartment three-quarters full. The paper tube was then withdrawn so as to leave the upper compartments empty. The open end of the tube was protected against entrance of moisture by a drying tube containing phosphorus pentoxide.

The glass tube containing the mixture of phosphorus pentoxide and phosphorus pentasulfide was then inserted into an electrically heated furnace horizontally so as to leave the empty compartments projecting outside the furnace. The temperature of the reactants was gradually raised until liquid began to condense in the first empty compartment. Reaction was observed at approximately 350 degrees centigrade and proceeded at a satisfactory rate of 400 degrees centigrade.

The product was redistilled by moving the tube gradually further into the furnace, and the redistilled product was collected in the third compartment of the tube. After being cooled, the apparatus was cut apart and the purified phosphorus oxysulfide in the third compartment of the tube was recovered.

The weight of the product thus obtained was approximately forty percent that of the mixed reactants used. It was a pale yellow, waxy appearing hygroscopic solid when cold. At 102 degrees centigrade it melted completely to a pale yellow liquid. On cooling the melt, it began to freeze at 102 degrees centigrade, but did not completely solidify until cooled to approximately eighty degrees centigrade. The physical and chemical properties and chemical composition of the product were similar to those of the product prepared by Thorpe and Tutton, J. Chem. Soc. (London) 1891, vol. 59, pages 1019–29, which they called phosphorus sulfoxide, and to which they assigned the formula $P_4S_4O_6$.

Example 2

A portion of the intimate mixture of phosphorus pentoxide and phosphorus pentasulfide described in Example 1 was introduced into a distilling flask having a side arm of relatively large bore sealed thereon. The flask was heated to 400 degrees centigrade in a metal bath for three hours, during which period a liquid product formed and refluxed. The temperature of the bath was then raised to 500 degrees centigrade for two hours, during which period, product equivalent to about fifty percent of the initial charge distilled through the side arm and was collected in a test tube. The materials were protected throughout these operations by an atmosphere of dry nitrogen.

The product obtained was redistilled at subatmospheric pressure. Nearly all of it distilled in the range of 180 to 190 degrees centigrade at a pressure of twenty millimeters of mercury.

Example 3

A mixture consisting of phosphorus pentoxide and phosphorus pentasulfide in the ratio of two moles of phosphorus pentoxide to three moles of phosphorus pentasulfide was heated in a test tube at atmospheric pressure while protected under an atmosphere of dry nitrogen. This mixture completely liquefied by heating to 450 degrees centigrade for twenty minutes. Distillation of the product at subatmospheric pressure gave a fifty percent yield of a light yellow material distilling in the range of 180 to 190 degrees centigrade at twenty millimeters of mercury. This distillate was essentially phosphorus trioxydisulfide and had a melting point of 102 degrees centigrade. A higher boiling fraction, which distilled in the range of 190 to 350 degrees centigrade at twenty millimeters of mercury, was dark brown in color, was not completely identified, but probably was a mixture containing one or more other compounds of phosphorus, sulfur and oxygen together with some unreacted phosphorus sulfide.

While all the evidence indicates that phosphorus trioxydisulfide ($P_4S_4O_6$) comprises a major portion of the product formed in this example, other compounds containing either a greater or smaller proportion of sulfur are probably formed also.

Example 4

Into a steel autoclave was charged an intimate mixture of 2.91 pounds of phosphorus pentoxide ($P_2O_5$) and 2.93 pounds of phosphorus pentasulfide ($P_2S_5$). This corresponds to a ratio of approximately 3.1 mole parts of phosphorus pentoxide to two mole parts of phosphorus pentasulfide. The autoclave was closed and heated to 440–450 degrees centigrade for six hours. After being cooled, the autoclave was opened, and the hard reaction product was chipped out.

When a sample of the product was strongly heated, it partially but not completely liquefied. The entire batch was transferred to a three-liter glass distilling apparatus that was heated electrically and the lower-boiling component of the product was distilled at a pressure of five millimeters of mercury. The product collected was a pale yellow liquid that was contaminated by a small amount of yellow solid impurity. It was redistilled through a short fractionating column at a pressure of three millimeters of mercury, most of the product distilling at approximately 160 degrees centigrade. Near the end of the distillation there was collected a small amount of higher boiling (to 185 degrees centigrade) material that was also more viscous.

The distillate was melted and well mixed in an atmosphere of dry carbon dioxide, then the oily-appearing, pale yellow liquid was blown into small dry bottles and allowed to solidify. It formed a pale crystalline mass melting at 100–102 degrees centigrade. The yield of this product, which was essentially phosphorus trioxydisulfide, was about 3.3 pounds, approximately 56 percent of the initial weight of the reactants.

*Example 5*

Into a steel autoclave was charged an intimate mixture of 5.81 pounds of phosphorus pentoxide and 5.86 pounds of phosphorus pentasulfide, which corresponds to a molecular ratio of approximately 3.1 parts of phosphorus pentoxide to 2 parts of phosphorus pentasulfide. The autoclave was closed and heated between temperatures of 400 and 460 degrees centigrade for fifteen hours. The temperature was then raised to 500 degrees centigrade for a few minutes, at which temperature the gauge pressure was 70 pounds per square inch. After cooling the autoclave, the plug closure in the top thereof was removed and the apparatus was prepared for distillation by insertion of a steel pipe leading to a condensing system.

The volatile reaction products were distilled from the autoclave at a subatmospheric pressure of 2 to 3 millimeters of mercury and boiled within the range of 152 to 210 degrees centigrade. The product collected was, when molten, a pale yellow liquid contaminated with a small amount of yellow solid impurity. It weighed 5.96 pounds, which corresponds to approximately 51.8 percent of the calculated yield (based on phosphorus pentasulfide conversion to phosphorus trioxydisulfide).

The entire distillate (152–210/2–3 mm.), weighing 5.96 pounds, was collected in a 3-liter glass flask, from which it was redistilled by heating it electrically and passing the vapors through a fractionating column 20 inches in length at a pressure between 1 and 2 millimeters of mercury. Nine fractions, as follows, were collected:

| Fraction Number | Boiling Range, degrees centigrade | Weight, grams |
| --- | --- | --- |
| 1 | 126 –138 | 100 |
| 2 | 138 –140.5 | 436.5 |
| 3 | 140.5–142 | 652 |
| 4 | 142 –153 | 505 |
| 5 | 153 –171.5 | 488 |
| 6 | 171.5–175.5 | 180 |
| 7 | 173 –193 | 174 |
| 8 | 193 –220 | 128 |
| 9 | 220 –230 | 29.5 |

The total weight of the redistilled fractions was 2693 grams, equivalent to 99.5 percent of the crude distillate. The major fractions (2, 3 and 4, between 138 and 153 degrees), were essentially phosphorus trioxydisulfide and comprised nearly 60 percent of the products recovered or approximately 31 percent of the initial weight of the reactions.

Fractions 1 to 4 were nearly colorless when molten and, when cooled, solidified quickly to hard crystalline solids. Fraction 5 contained a considerable proportion of an oily component which did not solidify rapidly. Fraction 6 was a viscous, oily liquid which solidified slowly after standing several hours at room temperature. Fractions 7, 8 and 9 were very viscous liquids which solidified rapidly. The darkness of the yellow color of the fractions increased progressively with their boiling ranges, Fraction 1 being the lightest yellow and Fraction 9 being the darkest yellow.

Although, for the preparation of phosphorus trioxydisulfide, I prefer to use phosphorus pentoxide and phosphorus pentasulfide in the molecular ratio of three to two, as required stoichiometrically by the equation set forth hereinbefore, these proportions may be varied greatly, as shown in Examples 3, 4 and 5. I may also add during the course of the heating either in one addition or in small increments, an intimate mixture of the two reactants in molecular proportions different from that of the mixture which was initially charged.

The present specification describes batch operations for purposes of simplicity. However, it is to be understood that for larger production units continuous operation with continuous charging of mixture to compensate or replace partially the product expelled from the unit, is contemplated. Such continuous reactors will preferably be provided with mechanical stirrers or agitators and will be constructed of metals such as iron, steel, or other suitable alloys of iron, or of glass-lined reaction equipment. The condensing and collecting units will preferably be constructed of glass or glass-lined metals so as to insure purity of the products, although metal condensers and receivers may be used.

Although purification of the phosphorus oxysulfide by distillation at subatmospheric pressures is preferred, other suitable conventional methods of purification may be used.

*Example 6*

Thirty-five grams of phosphorus sulfoxide prepared as described in Example 2 was intimately mixed with 4 grams of fresh phosphorus pentoxide. The distillate obtained was appreciably lighter in color than the original but it still retained some yellow color.

The foregoing distillate was mixed with fresh phosphorus pentoxide and again redistilled, whereupon it was nearly colorless. When cooled it solidified, forming a hard white crystalline mass, which, when heated, began to melt at 120 degrees centigrade and was completely melted at 130 degrees centigrade.

The foregoing product was further purified by vacuum sublimation at 180 degrees centigrade at a subatmospheric pressure of 20 millimeters of mercury. The white crystals so obtained melted in the range of 122 to 125 degrees centigrade. This substance is very hygroscopic; after exposure to undried air for a brief period it no longer melted sharply, but was only partially liquefied by heating to 200 degrees centigrade.

Analysis of the product for phosphorus and sulfur yielded the following results, indicating the oxysulfide of phosphorus to have the empirical formula $P_6S_5O_{10}$:

|  | Found | Calculated for $P_6S_5O_{10}$ |
|---|---|---|
| Phosphorus | 36.88<br>36.92<br>36.46 | 36.76 |
| Sulfur | 31.8<br>31.6 | 31.62 |

Although this is the preferred method for the preparation of the oxysulfide having the empirical formula $P_6S_5O_{10}$, it is obvious that it may be prepared by the general reaction of phosphorus pentoxide and phosphorus pentasulfide as herein described, and isolated from the products of such reaction by conventional methods. The empirical formula $P_6S_5O_{10}$ corresponds to a compound formed from 1 molecule of $P_2S_5$ and 2 molecules of $P_2O_5$.

Inasmuch as the foregoing description comprises preferred illustrative embodiments of my invention, it is to be understood that my invention is not restricted thereto, and that obvious modifications and alterations may be made therein in conventional manner without departing from the invention, which is to be limited solely by the scope of the appended claims.

I claim:

1. A process for the production of an oxysulfide of phosphorus which comprises: mixing together phosphorus pentoxide and phosphorus pentasulfide and thereafter heating the said mixture at a temperature above approximately 350 degrees centigrade and recovering the oxysulfide of phosphorus thus formed.

2. A process for the production of an oxysulfide of phorphorus which comprises: heating an intimate mixture consisting essentially of phosphorus pentoxide and phosphorus pentasulfide at a temperature within the range of approximately 400 degrees to approximately 500 degrees centigrade and recovering the phosphorus oxysulfide thus formed.

3. A process for the production of phosphorus trioxydisulfide which comprises: heating an intimate mixture of approximately three molecular proportions of phosphorus pentoxide and two molecular proportions of phosphorus pentasulfide at a temperature within the range of approximately 400 degrees to approximately 500 degrees centigrade, while collecting and condensing the phosphorus trioxydisulfide evolved therefrom.

4. A continuous process for the production of phosphorus trioxydisulfide which comprises: heating an intimate mixture of approximately three molecular proportions of phosphorus pentoxide and two molecular proportions of phosphorus pentasulfide at a temperature within the range of approximately 400 degrees centigrade and approximately 500 degrees centigrade; continuously withdrawing therefrom the phosphorus trioxydisulfide that is produced therein; and, continuously adding thereto fresh amounts of the mixture of phosphorus pentoxide and phosphorus pentasulfide to replace the phosphorus oxysulfide withdrawn therefrom.

5. The oxysulfide of phosphorus having the empirical formula $P_6S_5O_{10}$, which is a white, crystalline substance having a melting point, in the pure state, of 122 to 125 degrees centigrade.

6. A process for the production of an oxysulfide of phosphorus which comprises: heating an intimate mixture of phosphorus pentoxide and phosphorus pentasulfide, the molecular ratio of phosphorus pentasulfide to phosphorus pentoxide being at least 2 mols for each 3 moles of phosphorus pentoxide, at a temperature within the range of approximately 400 degrees to approximately 500 degrees centigrade and recovering the oxysulfide of phosphorus thus formed.

JOHN CARL PERNERT.

REFERENCES CITED

The following references are of record in the file of this patent:

Mellor: "Treatise on Inorganic and Theoretical Chemistry" (1928), vol. VIII, page 1061.

Roscoe et al.: "Treatise on Chemistry," vol. 1 (1905), MacMillan and Co., Lmt., New York, pages 662 and 663.